United States Patent
Li et al.

(10) Patent No.: US 10,051,463 B2
(45) Date of Patent: Aug. 14, 2018

(54) METHODS AND SUBSCRIBER DATA STORAGE NODES FOR HANDLING SIGNALING REQUESTS IN A COMMUNICATION SYSTEM

(71) Applicant: TELEFONAKTIEBOLAGET L M ERICSSON (PUBL), Stockholm (SE)

(72) Inventors: Qiang Li, Täby (SE); Justus Petersson, Hässelby (SE); Stefan Thuresson, Segeltorp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 192 days.

(21) Appl. No.: 15/037,283

(22) PCT Filed: Dec. 2, 2013

(86) PCT No.: PCT/EP2013/075204
§ 371 (c)(1),
(2) Date: May 17, 2016

(87) PCT Pub. No.: WO2015/081972
PCT Pub. Date: Jun. 11, 2015

(65) Prior Publication Data
US 2016/0295399 A1   Oct. 6, 2016

(51) Int. Cl.
*H04W 8/26* (2009.01)
*H04W 8/06* (2009.01)
(Continued)

(52) U.S. Cl.
CPC .............. *H04W 8/26* (2013.01); *H04W 4/70* (2018.02); *H04W 8/04* (2013.01); *H04W 8/06* (2013.01); *H04W 8/082* (2013.01); *H04W 8/183* (2013.01)

(58) Field of Classification Search
CPC ............ H04W 8/12; H04W 8/04; H04W 8/02
See application file for complete search history.

(56) References Cited

U.S. PATENT DOCUMENTS

| | | | | |
|---|---|---|---|---|
| 5,940,512 A | * | 8/1999 | Tomoike | H04W 12/06 380/248 |
| 2012/0282924 A1 | * | 11/2012 | Tagg | H04W 60/06 455/432.1 |
| 2015/0031356 A1 | * | 1/2015 | Gupta | H04W 8/02 455/433 |

FOREIGN PATENT DOCUMENTS

| EP | 2635056 A1 | 9/2013 |
|---|---|---|
| WO | 2013025806 A1 | 2/2013 |

* cited by examiner

Primary Examiner — Omoniyi Obayanju

(57) ABSTRACT

A method performed by a subscriber data storage node of a visiting communication network for handling a signalling request in a communication system comprising a home communication network and the visiting communication network. The signalling request originates from a communication device subscribing to the home communication network and having a home subscriber identification, ID, for communication in the home communication network. The communication device is registered to the visiting communication network with a local subscriber ID different from the home subscriber ID, the local subscriber ID being associated with the home subscriber ID. The method comprises receiving the signalling request originating from the communication device, the signalling request being associated with the local subscriber ID and identifying that the local subscriber ID is associated with the home subscriber ID. The method further comprises requesting a subscriber data from a subscriber data storage node of the home communication network, the request comprising the home (Continued)

subscriber ID, and receiving the subscriber data from the subscriber data storage node of the home communication network.

16 Claims, 10 Drawing Sheets

(51) Int. Cl.
*H04W 8/04* (2009.01)
*H04W 8/08* (2009.01)
*H04W 8/18* (2009.01)
*H04W 4/70* (2018.01)

METHODS AND SUBSCRIBER DATA STORAGE NODES FOR HANDLING SIGNALING REQUESTS IN A COMMUNICATION SYSTEM

This application is a 371 of International Application No. PCT/EP2013/075204, filed Dec. 2, 2013, the disclosure of which is fully incorporated herein by reference.

TECHNICAL FIELD

The present disclosure relates generally to methods performed by subscriber data storage nodes of home communication networks and of visiting communication networks. The present disclosure further relates to corresponding subscriber data storage nodes of home communication networks and of visiting communication networks.

BACKGROUND

The mobile communication system of the world comprises a plurality of mobile communication networks owned by different operators. A communication device is registered as a subscriber of a home communication network but can today, when moving to another communication network that the device is not subscribing to, acquire connectivity in this communication network. There are today two different general procedures for a communication device to acquire connectivity to another communication network, hereinafter called a visiting communication network: Roaming, and changing to a subscriber identity module, SIM, card from the operator of the visiting communication network.

In the roaming procedure, a global enterprise owning a number of communication devices all over the world, for example a machine-to-machine service provider, M2M SP, has a single business relationship and billing interface towards the home network operator. When in a visiting communication network owned by a roaming partner, a communication device will be roaming to get access through the roaming partner's access network while remaining being a subscriber of the home communication network. With a roaming solution, an enterprise can maintain single business relationship and billing interface towards its home communication network operator with roaming devices all over the world. However, roaming agreement is needed between each visiting communication network and the home communication network. A communication device will not be able to connect to the visiting communication network if the visiting communication network operator does not have a roaming agreement with the home communication network operator, or if roaming is not allowed in the visiting communication network, (e.g. due to operator determined barring of roaming by its home network operator).

In the changing of SIM card procedure, subscription is switched to the local network operator for the visiting communication network, (e.g. by changing to the new local network operator's SIM card in the device), so that the communication device can acquire the local connectivity and the visiting communication network becomes the new home communication network for the communication device. This means that the business relationship and billing relationship for the communication device subscription has also changed from its original home network operator to the new local network operator. A switch of subscription could give access to the communication device in VPLMN, but it does not allow the enterprise to maintain a single business relationship and billing interface for its devices towards its home network operator. The enterprise also cannot reuse the same functionality for its services and devices deployed all over the world because they are not serviced by single operator. Instead, the devices will get different functionalities and connectivity services by each different local network operator of each different visiting communication network.

Consequently, there is a need for a solution that enables a communication device subscribing to a home communication network to connect to a visiting communication network even without a roaming agreement between the home communication network operator and the visiting communication network operator, or without roaming signaling being established between the visiting communication network and the home communication network. This connection should preferably also be accomplished while the enterprise still keeps a single business relationship and billing interface towards the home communication network operator.

SUMMARY

It is an object of the invention to address at least some of the problems and issues outlined above. It is possible to achieve these objects and others by using a method and an apparatus as defined in the attached independent claims.

According to one aspect, a method is provided performed by a subscriber data storage node of a visiting communication network for handling a signalling request in a communication system comprising a home communication network and the visiting communication network. The signaling request originates from a communication device subscribing to the home communication network and having a home subscriber ID for communication in the home communication network. The communication device is registered to the visiting communication network with a local subscriber ID different from the home subscriber ID, the local subscriber ID being associated with the home subscriber ID. The method comprises receiving the signaling request originating from the communication device, the signalling request being associated with the local subscriber ID and identifying that the local subscriber ID is associated with the home subscriber ID. The method further comprises requesting a subscriber data from a subscriber data storage node of the home communication network, the request comprising the home subscriber ID, and receiving the subscriber data from the subscriber data storage node of the home communication network.

According to another aspect, a method is provided performed by a subscriber data storage node of a home communication network for communicating with a subscriber data storage node of a visiting communication network. The subscriber data storage node of the visiting communication network has received a signalling request originating from a communication device subscribing to the home communication network and having a home subscriber identification, ID, for communication in the home communication network. The communication device is registered to the visiting communication network with a local subscriber ID different from the home subscriber ID, the local subscriber ID being associated with the home subscriber ID. The method comprises receiving a request of subscriber data from the subscriber data storage node of the visiting network, wherein the request comprises the home subscriber ID, obtaining subscriber data of the home subscriber ID and sending the obtained subscriber data to the subscriber data storage node of the visiting network.

According to another embodiment, a subscriber data storage node of a visiting communication network is provided for handling a signalling request in a communication system comprising a home communication network and the visiting communication network. The signaling request originates from a communication device subscribing to the home communication network and having a home subscriber identification, ID, for communication in the home communication network. The communication device is registered to the visiting communication network with a local subscriber ID different from the home subscriber ID, the local subscriber ID being associated with the home subscriber ID. The subscriber data storage node comprises a processor and a memory, said memory containing instructions executable by said processor. Said subscriber data storage node of the visiting network is operative for receiving the signaling request originating from the communication device, the signalling request being associated with the local subscriber ID and identifying that the local subscriber ID is associated with the home subscriber ID. Said subscriber data storage node of the visiting network is further operative for requesting a subscriber data from a subscriber data storage node of the home communication network, the request comprising the home subscriber ID, and receiving the subscriber data from the subscriber data storage node of the home communication network.

According to yet another aspect, a subscriber data storage node of a home communication network is provided for communicating with a subscriber data storage node of a visiting communication network. The subscriber data storage node of the visiting communication network has received a signalling request originating from a communication device subscribing to the home communication network and having a home subscriber identification, ID, for communication in the home communication network. The communication device is registered to the visiting communication network with a local subscriber ID different from the home subscriber ID, the local subscriber ID being associated with the home subscriber ID. The subscriber data storage node comprises a processor and a memory, said memory containing instructions executable by said processor. Said subscriber data storage node is operative for receiving a request of subscriber data from the subscriber data storage node of the visiting network, wherein the request comprises the home subscriber ID, obtaining subscriber data of the home subscriber ID and sending the obtained subscriber data to the subscriber data storage node of the visiting network.

According to other aspects, computer programs and computer program products are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to make it possible for a communication device subscribing to a home communication network using a home subscriber ID to connect to a visiting communication network using a local subscriber ID without standard roaming agreements and roaming fees and without completely changing subscription to the visiting communication network operator. The local subscriber ID is then associated with the home subscriber ID. This may be achieved by using a local subscriber ID to send a signaling request to the visiting (local) network. Then at an HLR of the visiting network identifying that the local subscriber ID is associated with the home subscriber ID, then requesting certain subscriber data from the HLR of the home network, the certain subscriber data including traffic data. The requested traffic data of the home network, such as SMS-C of home network, billing information etc. are then used for routing traffic via the home network SMS-C etc. Thereby, it is possible for the home network to bill the communication device even though it is connected to another network.

Figure 1:
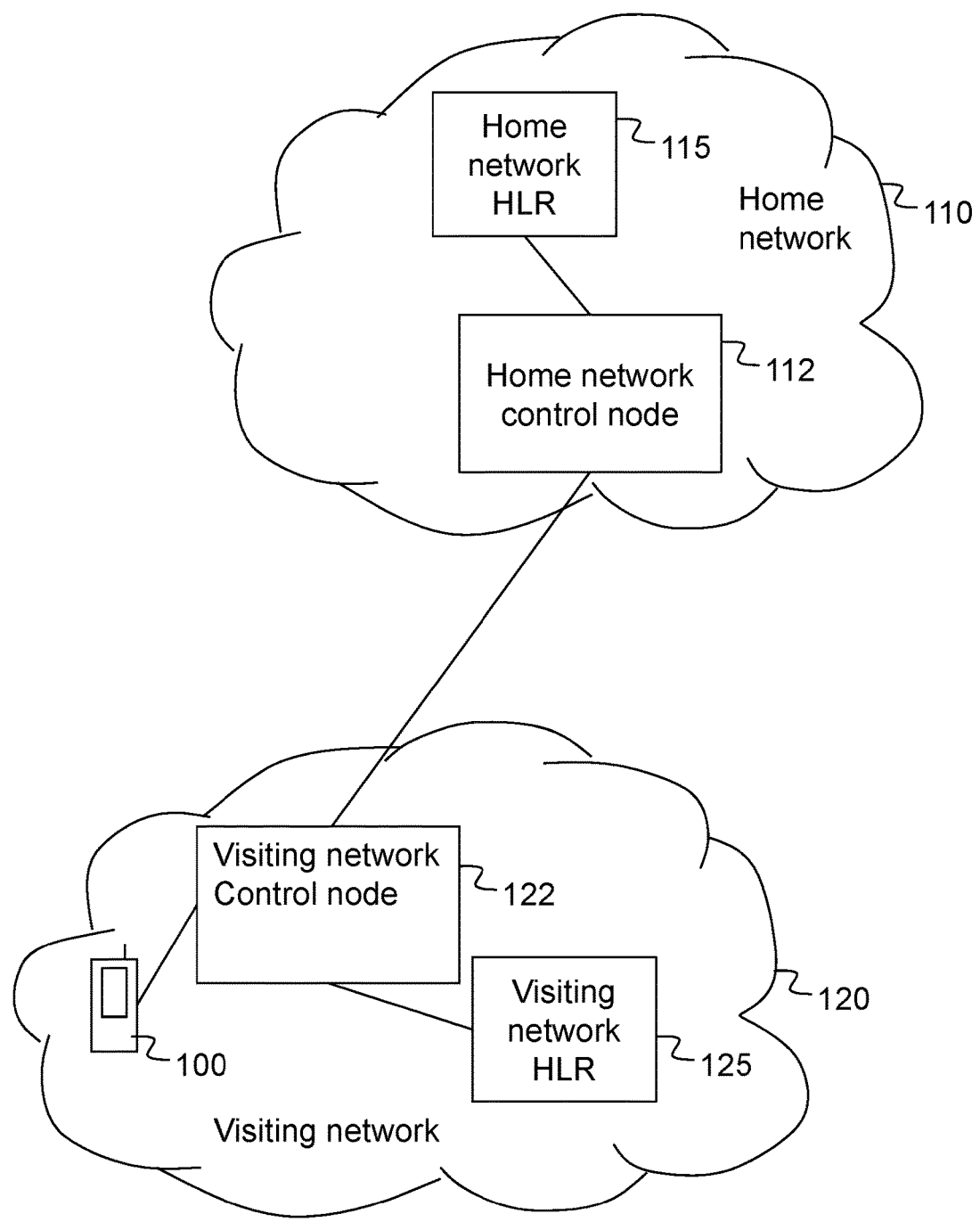
FIG. 1 is a schematic block diagram of an exemplary communication system in which the present invention may be used.

FIG. 1 shows an exemplary communication system in which embodiments of the present invention may be used. The communication system comprises a home communication network 110 comprising a subscriber data storage node 115 realized as a home location register, HLR and a control node 112. The communication system further comprises a visiting communication network 120 comprising a subscriber data storage node 125 realized as an HLR and a control node 122. The home communication network is also called the home network in the disclosure. The visiting communication network is also called the visiting network in the disclosure. Also, a communication device 100 is shown. The communication device may be any kind of device having mobile communication abilities, such as a mobile station, a lap-top, a vending machine equipped with mobile communication abilities etc. Observe that FIG. 1 only shows an alternative communication system architecture in which embodiments of the present invention may be used. Other communication system architectures may be used, for example, another communication system architecture will be presented later in connection with FIG. 5, in which the home network HLR 115 and the visiting network HLR 125 will be implemented in a first network 130 and connected to a first network control node 135.

Figure 2:
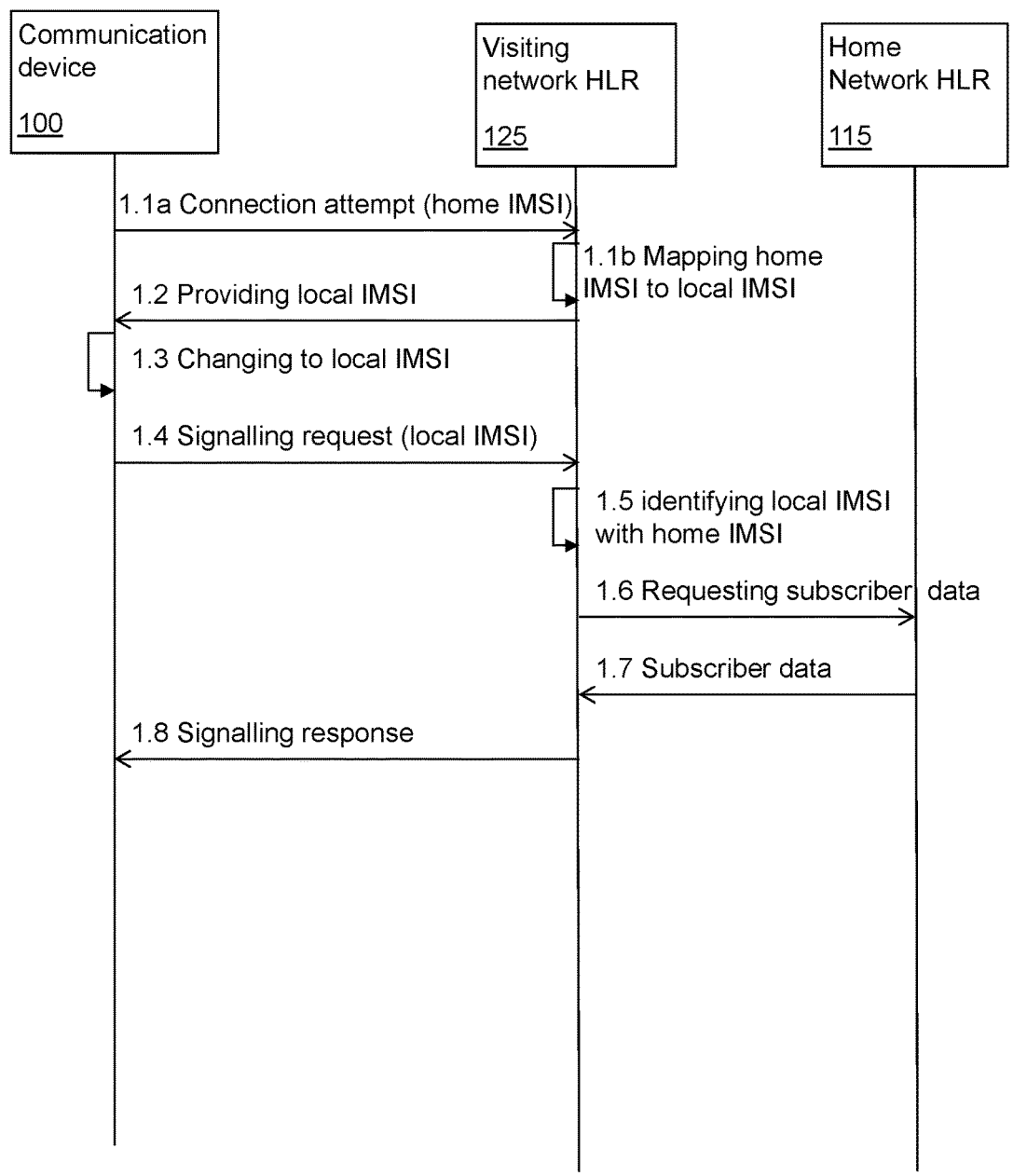
FIG. 2 is a signaling diagram of methods according to an embodiment.

FIG. 2 shows an exemplary embodiment of the signaling taking place between the different communication nodes of FIG. 1. When a communication device 100 subscribing to the home communication network 110 arrives at the visiting communication network 120, it tries to connect 1.1a to the visiting network with its home International Mobile Subscriber Identity, IMSI. The IMSI is an example of a subscriber identification, ID. Another example of a subscriber ID is a Mobile Station International Subscriber Directory Number, MSISDN. When the visiting network control node 122 receives the connection attempt it identifies the IMSI to be from another network and sends the connection attempt to the visiting network HLR 125. The visiting network HLR 125 maps 1.1b the home IMSI to a local IMSI and stores the mapping. The local IMSI is an IMSI for use in the visiting network. The local IMSI is taken from a range of IMSI numbers dedicated to communication devices from the home network visiting the visiting network. The visiting network HLR then provides 1.2 the local IMSI to the communication device 100 via the visiting network control node 122. The communication device then changes 1.3 the home IMSI that it has stored, e.g. on its SIM card, to the local IMSI, and registers to the visiting network 120 with the local IMSI. Thereafter, the communication device 100 sends a signaling request 1.4 comprising the local IMSI to the visiting network HLR 125 via the visiting network control node 122. The visiting network HLR 125 identifies 1.5 that the local IMSI is associated with the home IMSI. Then the visiting network HLR 125 sends 1.6 a request for subscriber data to the home network HLR 115, the request comprising the home IMSI.

When the request for subscriber data is received at the home network HLR 115, the home network HLR obtains the subscriber data that is associated with the home IMSI and sends 1.7 it back to the visiting network HLR 125. Thereafter, the visiting network HLR, as a response to the received signaling request 1.4 sends 1.8 a signaling response back to the communication device via the visiting network control node. The requested subscriber data comprises traffic data such that traffic (e.g. SMS or data) may now be routed to the home network and billing calculations will be performed by the home network, e.g. by a business support system of the home network so that the enterprise that owns the communication device only gets a bill from the home network. The requested subscriber data may also comprise access credentials. Alternatively, the access credentials may be provided by the visiting network.

Figure 3:
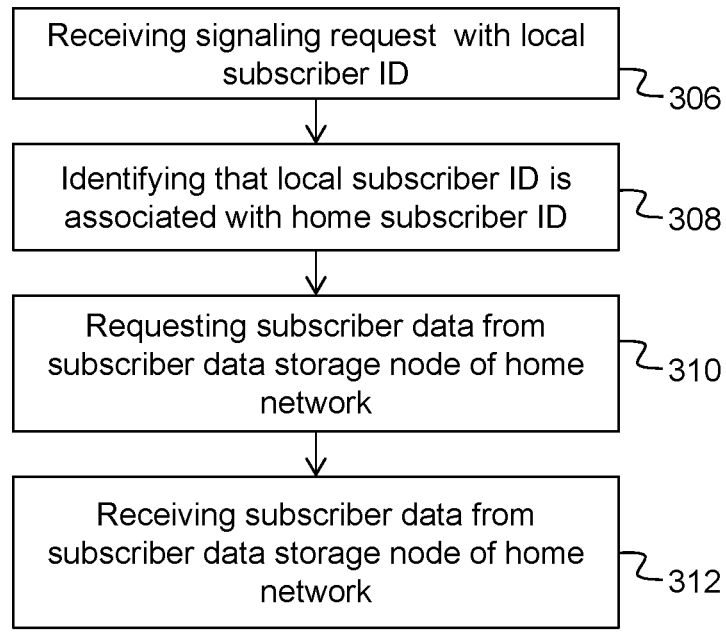
FIGS. 3-4 are flow charts describing methods according to embodiments of the invention.

FIG. 3 is a flow chart illustrating a method according to an embodiment performed by a subscriber data storage node 125 of a visiting communication network 120 for handling a signalling request in a communication system comprising a home communication network 110 and the visiting communication network 120. The signaling request originates from a communication device 100 subscribing to the home communication network 110 and having a home subscriber identification, ID, for communication in the home communication network. The communication device is registered to the visiting communication network 120 with a local subscriber ID different from the home subscriber ID, the local subscriber ID being associated with the home subscriber ID. The method comprises receiving 306 the signalling request originating from the communication device, the signalling request being associated with the local subscriber ID and identifying 308 that the local subscriber ID is associated with the home subscriber ID. The method further comprises requesting a subscriber data from a subscriber data storage node 115 of the home communication network, the request comprising the home subscriber ID, and receiving 312 the subscriber data from the subscriber data storage node 115 of the home communication network.

A signaling request is any kind of request for a service in the communication network, such as an authentication request, location update request, a request for sending an SMS, setting up a voice call, etc. The home communication network is the network to which the communication device is registered as a subscriber. The home subscriber ID is a subscriber ID, e.g. International Mobile Subscriber Identification, IMSI, which the communication device normally uses, for example when communicating in the home communication network, and when roaming in other communication networks. The visiting communication network is the network that the communication device currently visits, i.e. is temporary connected to. The local subscriber ID is a subscriber ID, e.g. IMSI, which the communication device uses for communication in the visiting network, which makes it possible for the communication device to have a local connection in the visiting network without having to roam. The subscriber data storage node of the visiting communication network may be a home location register front end, HLR FE, of the visiting communication network. The subscriber data storage node of the home network may be a Centralized User Data Base, CUDB of the home network.

By replacing the temporary local subscriber ID with the home subscriber ID in visiting network and in the subscriber data storage node of the visiting network requesting and receiving subscriber data from the subscriber data storage node of the home communication network it is possible for the home communication network to e.g. bill the owner of the communication device for the service requested in the signaling request. Further, it is possible for a subscriber of the home network to have a local communication in the visiting communication network without having to perform roaming. This makes it possible for an enterprise to only have an agreement with the home communication network and not necessarily with the visiting communication network, and this without having to pay high roaming costs.

According to an embodiment, the subscriber data requested 310 (and received 312) comprises traffic data. Traffic data may be e.g. which gateway to use between networks i.e. Access Point Name, APN, which SMS Center to use, PDP context profile, bearer service, roaming list etc. By requesting traffic data from the subscriber database of the home network, the traffic data used for routing messages from the communication device when in the visiting network will be data related to the home network, i.e. an APN of the home network, SMS Center of the home network. Thereby, messages from/to the home communication device when registered to the visiting network with a local subscriber ID will be routed via the home network, which makes it possible to have a local communication in the visiting communication network without having to perform roaming.

According to another embodiment, the subscriber data requested 310 (and received 312) also comprises access credentials. Access credentials may be e.g. KI (subscriber key for authentication of the IMSI), transport key (A4 keys for encrypt/decrypt KI), Operator key (OPc, for authentication of the IMSI). In other words, both traffic data and access credentials may originate from the home network even though the home communication device is connected to the visiting network with a local subscriber ID. According to another embodiment, the access credentials originate from the visiting network. In other words, the subscriber data requested from the home network data storage node or from the visiting network storage node, when pre-provisioned from the home network data storage node into the visiting network storage node, does not comprise the access credentials.

The requested subscribed data may also comprise other data such as Location data, e.g. SGSN/MSC/VLR address and MSISDN According to another embodiment, the subscriber data storage node 125 of the visiting network is arranged in a centralized network and the subscriber data storage node 125 of the visiting network is connected to the visiting network 120 via a control node 135 of the centralized network 130. According to yet another embodiment, the subscriber data storage node 125 of the visiting network comprises an HLR Front End, HLR-FE, and a Centralized User database, CUDB, and wherein the request is sent from the HLR-FE. For more information about these embodiments, see further down in connection with FIGS. 6-8.

Figure 4:
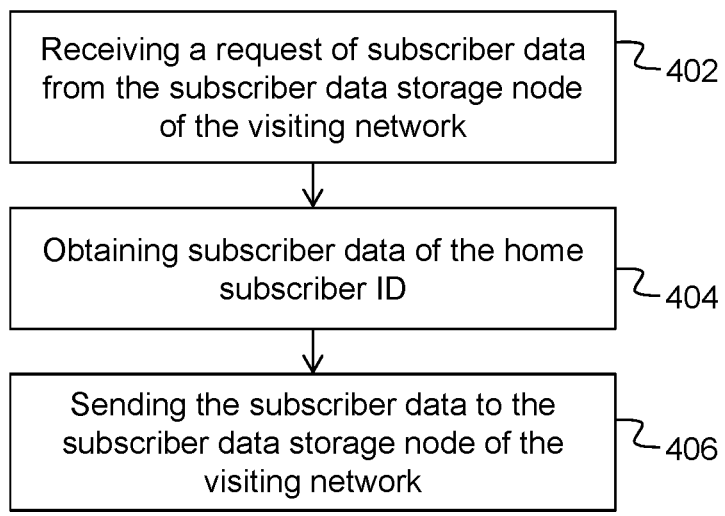

FIG. 4 is a flow chart illustrating a method according to an embodiment performed by a subscriber data storage node, 115 of a home communication network 110 for communicating with a subscriber data storage node 125 of a visiting communication network 120. The subscriber data storage node of the visiting communication network has received a signalling request originating from a communication device 100 subscribing to the home communication network 110 and having a home subscriber identification, ID, for communication in the home communication network. The communication device is registered to the visiting communication network 120 with a local subscriber ID different from the home subscriber ID, the local subscriber ID being associated with the home subscriber ID. The method comprises receiving 402 a request for subscriber data from the subscriber data storage node 125 of the visiting network, wherein the request comprises the home subscriber ID, obtaining 404 subscriber data of the home subscriber ID and sending 406 the obtained subscriber data to the subscriber data storage node of the visiting network. The method as described in connection with FIG. 4 is intended to work in co-operation with the method described in connection with FIG. 3 and provides the same advantages as the method of FIG. 3.

According to an embodiment, the subscriber data storage node 125 of the visiting communication network has been granted access to the subscriber data storage node 115 of the home communication network for the obtaining of subscriber data to be performed. The granting of access may be performed by the subscriber data storage node of the home communication network or by any other control node such as a control node 135 of a separate network. By granting access to the HLR of the visiting network to data of the HLR of the home network it is possible for the visiting network to receive the data of the home network even if there is an access permission procedure that is needed for receiving the data from another network.

According to another embodiment, the obtained subscriber data comprises traffic data and possibly also access credentials. According to yet another embodiment, the subscriber data storage node 115 of the home network comprises an HLR Front End, HLR-FE, and a Centralized User database, CUDB, and wherein the requested subscriber data is obtained from the CUDB. According to yet another embodiment, the subscriber data storage node 115 of the home network is arranged in a centralized network and the subscriber data storage node 115 of the home network is connected to the home network 120 via a control node 135 of the centralized network 130.

Figure 5:
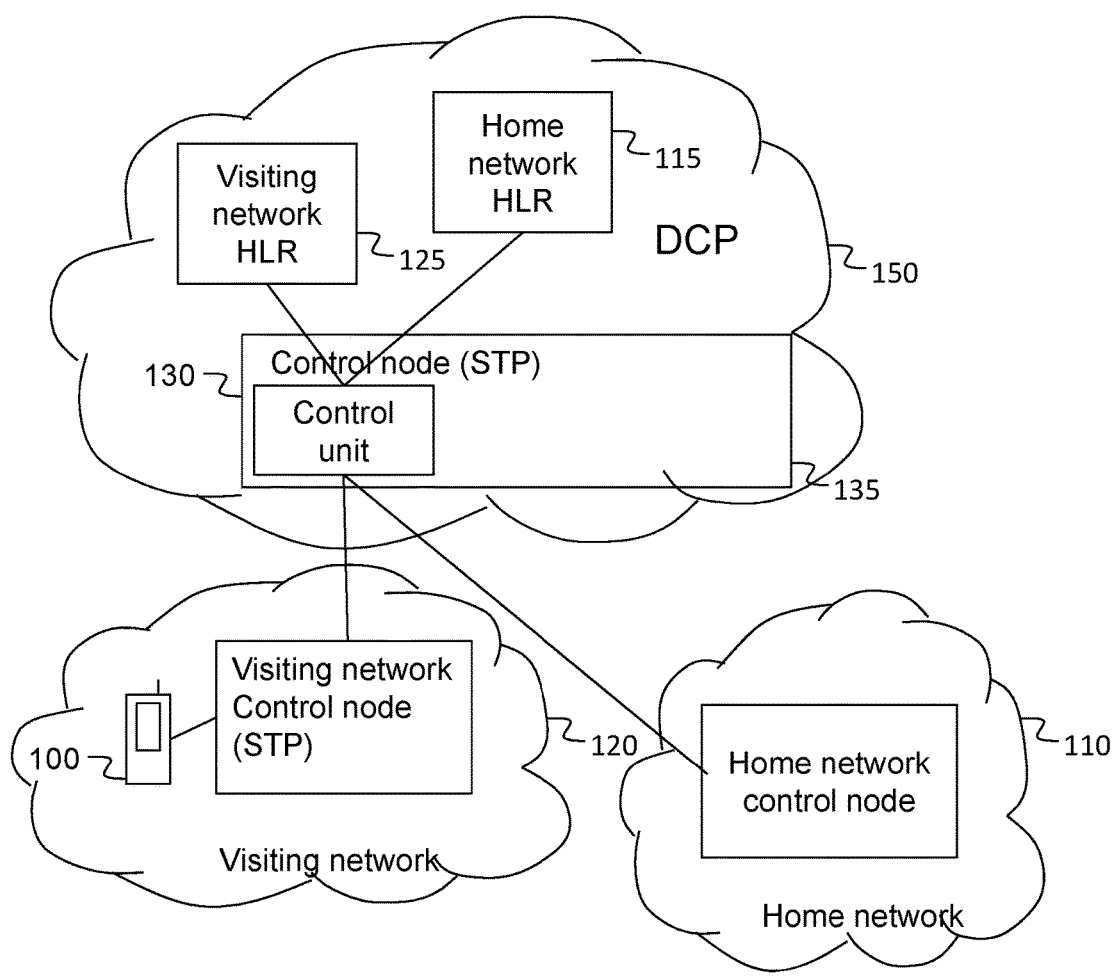
FIGS. 5-7 are schematic block diagrams of exemplary communication systems in which the present invention may be used.

FIG. 5 shows an embodiment of a communication system comprising a device connection platform, DCP 150. The device connection platform works like a hosted core network as a service for multiple operators. In this embodiment, the home network HLR 115 and a visiting network HLR 125 are both placed in the DCP 150. The DCP may be seen as a communication network, e.g. as the first communication network, as mentioned earlier. The DCP with its control node 130 and including the visiting network HLR 125 and the home network HLR 115 may be hosted and owned by a DCP network owner. The home network HLR 115 and the visiting network HLR 125 may be situated in one common DCP HLR. The actual subscriber may be hosted and managed by the home network, not by the visiting network. The visiting network may only provide the local network access and local IMSI for the home network subscriber to get local access.

In the following, in connection with embodiments described in connection with FIGS. 6 and 7, the visiting network is called MNO2, and the home network is called MNO1. Further the control nodes of this embodiment are Signaling Transfer Points, STPs, which are arranged for routing SS7 messages. A purpose of these embodiment are to enable the communication device belonging to a subscriber, for example an enterprise, subscribing to MNO1 to connect to MNO2 even without roaming agreement between MNO2 operator and MNO1 operator while at the same time the enterprise still keeps the single business relationship and billing interface towards the MNO1 operator. The enterprise can also reuse the same functionality for its services and connectivity all over the world with its single service provider MNO1.

Figure 6:
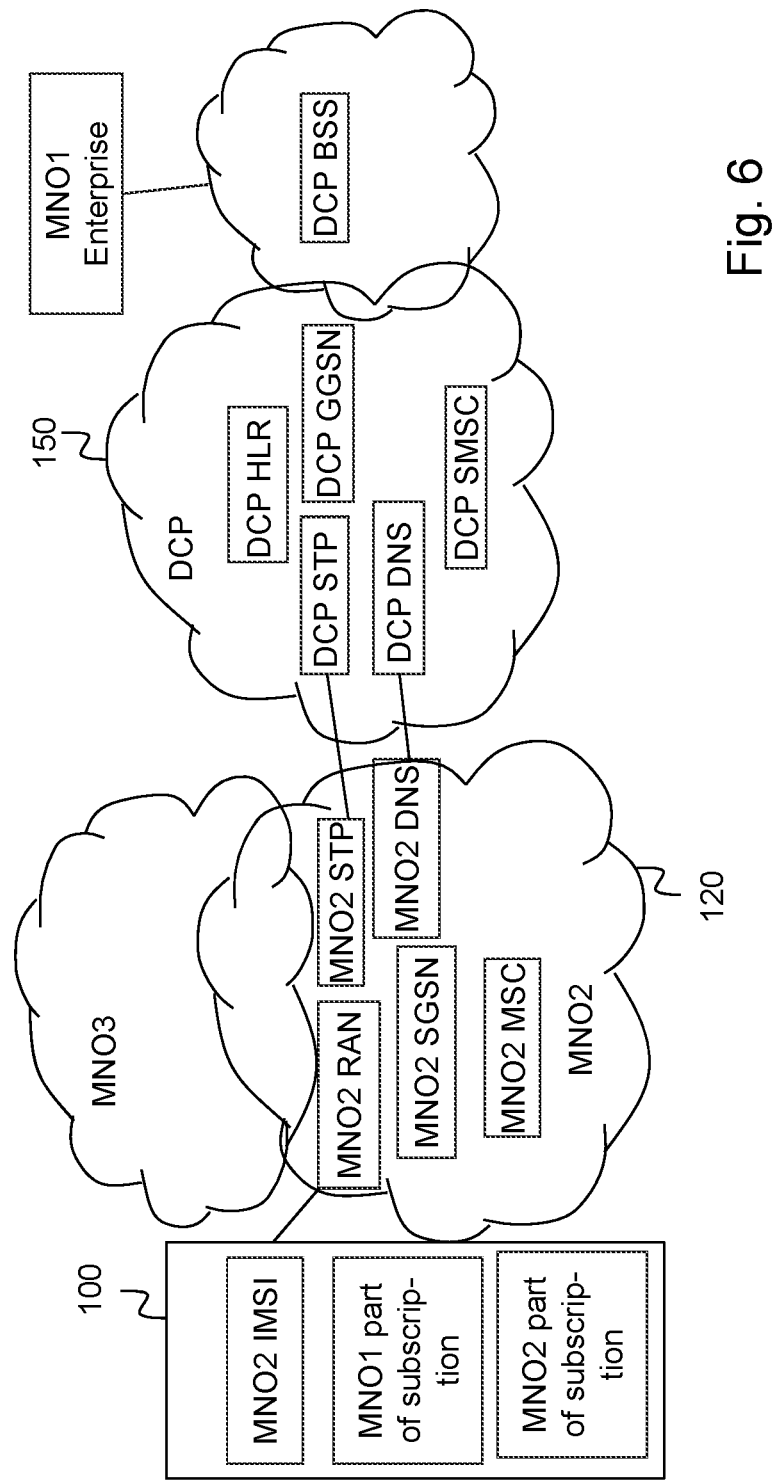

According to the embodiment shown in FIG. 6, MNO1 is fully on-boarded to the DCP network 150, i.e. the DCP STP, the DCP HLR, the DCP General Packet Radio Service, GPRS, Gateway Support Node, GGSN, the DCP Short Message Service Center, SMS-C, are all used for MNO1 and also shared with other operators fully on-boarded to the DCP network 150. Further, MNO2 120 is partly on-boarded to DCP Network, i.e. MNO2 STP is connected to DCP STP. Further, the communication device 100, when connected to MNO2 will use an MNO2 IMSI provided by the MNO2 and a first part of subscription data comprising traffic data from MNO1. The device 100 may also comprise a second part of subscription data originating from MNO2. The access credentials may partly originate from MNO2, if not originating from MNO1.

Figure 7:
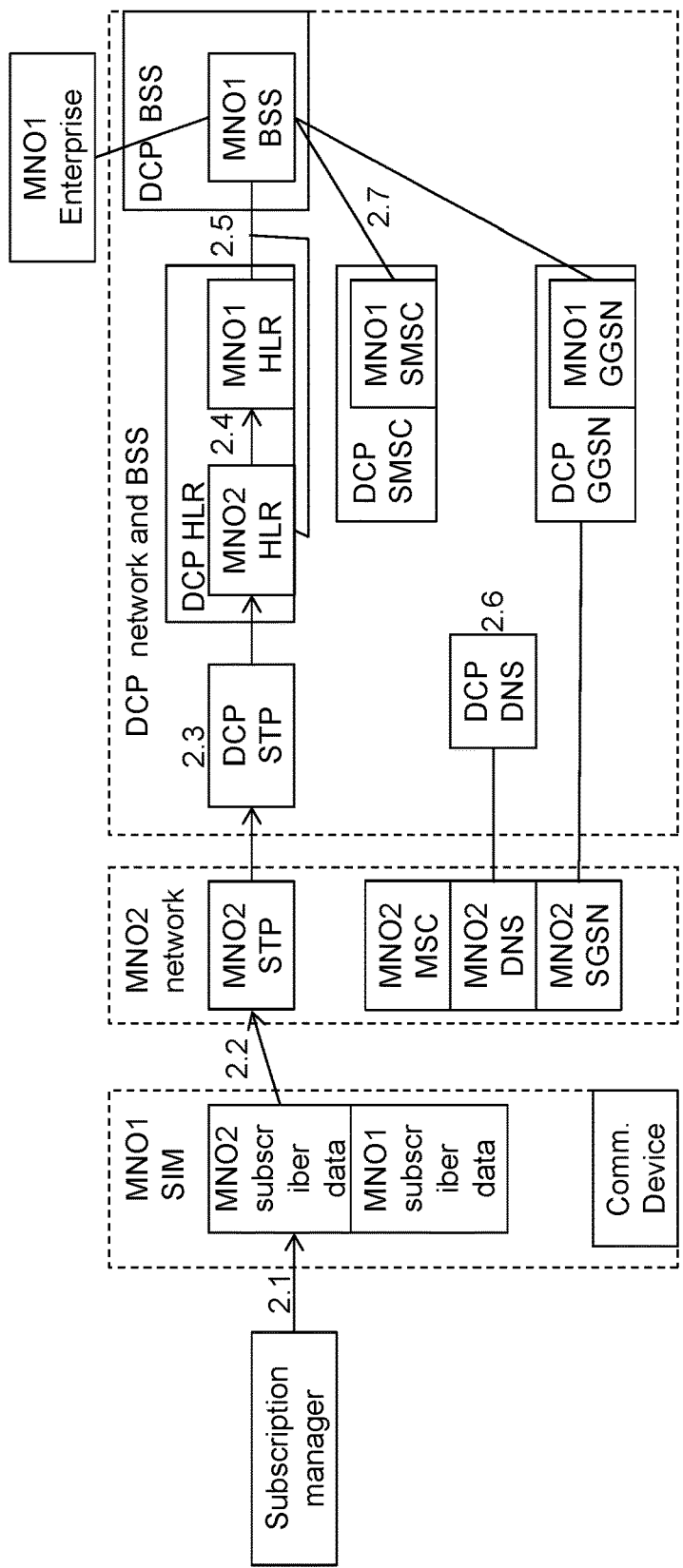

FIG. 7 shows signaling between blocks of a communication network according to an embodiment. A signal originates from a subscription manager, which may be for example a SIM provisioning by over-the-air server, SIMOTA server or an embedded Universal Integrated Circuit Card, eUICC, subscription manager. The subscription manager triggers 2.1 change of a first subscriber data part to MNO2 subscriber data for enabling local access, the first subscriber data part comprising MNO2 IMSI, within special IMSI range for visiting communication devices, and possibly other data, such as access credentials. More details about what kind of data that may belong to the first subscriber data part will be described further down. The server acquires the MNO2 subscriber data of the first subscriber data part (within the special IMSI ranges) from subscription stock from DCP HLR via DCP BSS.

Thereafter, the device changes the first subscriber data part to MNO2 subscriber data and connects 2.2 to the MNO2 network (Radio access and Core network) using MNO2 IMSI. A signaling request from the communication device with MNO2 subscriber data is routed via MNO2 STP to DCP STP, for further routing 2.3 to MNO2 HLR in DCP HLR. MNO2 HLR receives the request and identifies that the MNO2 IMSI is connected to MNO1 IMSI, so it will start interworking 2.4 with the MNO1 HLR in DCP HLR, e.g. acquiring subscription data e.g. for billing and traffic purposes, (e.g. APN, SMS-C, price profile, roaming profile, PDP context profile, bearer services, etc) from MNO1 HLR instead of from MNO2 HLR.

Both MNO1 HLR and MNO2 HLR will be connected 2.5 to MNO1 business support system, BSS, (Centralized BSS but "virtualized" for MNO1). BSS will contact with MNO2 HLR for access credentials, if provided from MNO2, and contact with MNO1 HLR for billing and traffic configuration, and possibly also access credentials if provided from MNO1.

Information about MNO1 SMS-C and MNO1 APN will be kept in the device SIM profile as part of MNO1 subscription profile (MNO1 subscriber data), so that all SMS traffic and data traffic will still be routed to MNO1 SMS-C and MNO1 GGSN. The MNO1 SMS-C and MNO1 APN will be kept in the device SIM profile, MNO1 SIM, as part of MNO1 subscription profile, so that all SMS traffic and data traffic will still be routed to MNO1 SMS-C and MNO1 GGSN. MNO2 DNS receives APN lookup request from the SGSN and will forward 2.6 the APN lookup request to DCP DNS, which will then return MNO1 GGSN address to the MNO2 SGSN for setting up a GTP tunnel between MNO2 SGSN and MNO1 GGSN.

MNO1 SMS-C and MNO1 GGSN will receive all UL/DL traffic for the device and generate traffic Call Data Records, CDR, and send 2.7 to MNO1 BSS for billing and invoicing to MNO1 Enterprise (i.e. the enterprise owning the communication device). The MNO1 BSS may also include an enterprise self service portal, so that the enterprise can reuse the same service functionalities from all over the world for managing its globally deployed devices and services.

Figure 8:
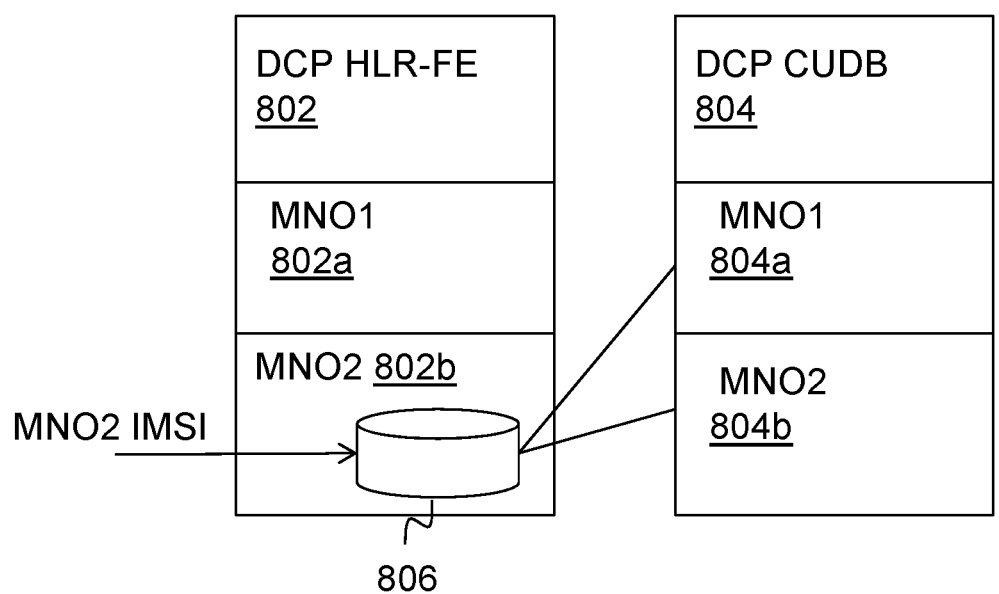
FIGS. 8-14 are schematic block diagrams showing different embodiments of the invention.

FIG. 8 shows an embodiment of a DCP HLR 800 (which may also be called a centralized HLR), comprising a DCP HLR-FE 802 and a DCP CUDB 804. The HLR-FE 802 has one MNO1 part 802a and one MNO2 part 802b. In the same manner, the CUDB 804 has one MNO1 part 804a and one MNO2 part 804b. The MNO2 part has a storage unit 806 comprising a number of IMSI number within a special range for visiting communication devices. Also, in the storage unit 806 a connection between MNO1 IMSI and MNO2 IMSI for the same communication device is stored. From the MNO1 part 804a of the CUDB, a first subscriber data part related to the communication device 100 is obtained, i.e. a subscriber data part that is going to be obtained from MNO1. From the MNO2 part 804b of the CUDB, a second subscriber data part is obtained, i.e. a subscriber data part that is going to be obtained from MNO2. According to a first embodiment, the first subscriber data part comprises traffic data, access credentials, except for MNO2 IMSI, and other data and the second subscriber data part comprises only the MNO2 IMSI. According to a second embodiment, the first subscriber data part comprises traffic data and the second subscriber data part comprises access credentials. In the second embodiment, other data may be in either first subscriber data part or second subscriber data part. According to a third embodiment, the first subscriber data part comprises only the part of the traffic data that concerns billing, e.g. billing profile, price profile and roaming profile, and the rest of the traffic data, such as SMS-C to use, PDP context profile etc., bearer services etc. are part of the second subscriber data part. This means that in this third embodiment, not only MNO2 HLR is used but also MNO2 GGSN and MNO2 SMSC for routing traffic. However, MNO2 GGSN and MNO2 SMSC should be connected to MNO1 BSS for sending CDRs to MNO1 BSS. Then MNO1 BSS generates billing/invoicing to MNO1 enterprise according to MNO1 subscription billing profile.

Figure 9:
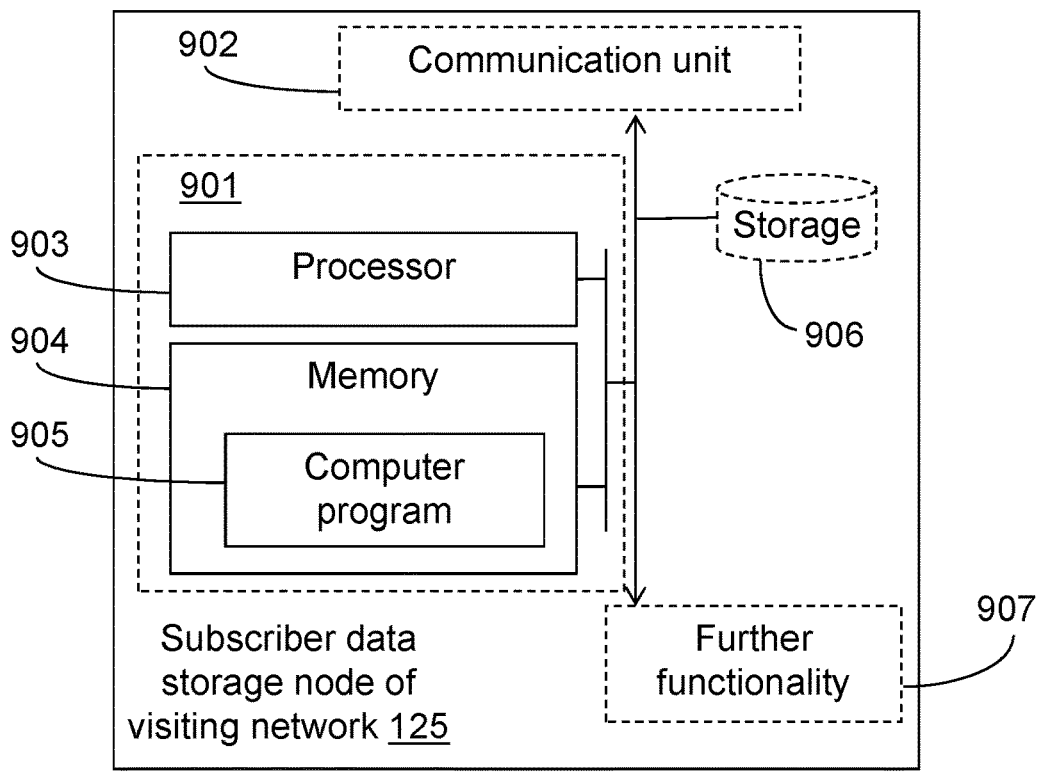

FIG. 9 (see also FIG. 1 or 4) shows a subscriber data storage node 125 of a visiting communication network 120 for handling a signalling request in a communication system comprising a home communication network 110 and the visiting communication network 120. The signaling request originates from a communication device 100 subscribing to the home communication network 110 and having a home subscriber identification, ID, for communication in the home communication network. The communication device is registered to the visiting communication network 120 with a local subscriber ID different from the home subscriber ID and the local subscriber ID is associated with the home subscriber ID. The subscriber data storage node 125 comprises a processor 903 and a memory 904, said memory containing instructions executable by said processor whereby said subscriber data storage node 125 is operative for receiving the signaling request originating from the communication device, the signaling request being associated with the local subscriber ID and identifying that the local subscriber ID is associated with the home subscriber ID. Said subscriber data storage node 125 is further operative for requesting a subscriber data from a subscriber data storage node 115 of the home communication network, the request comprising the home subscriber ID, and receiving the subscriber data from the subscriber data storage node 115 of the home communication network. The visiting network subscriber data storage node 125 may further comprise a communication unit 902, which may be considered to comprise conventional means for communicating from and/or to the other nodes in the network, such as the home network subscriber data storage node 115 and an access network via which the communication device 100 connects to the visiting network subscriber data storage node. The conventional communication means may include at least one transmitter and at least one receiver. The visiting network subscriber data storage node 125 may further comprise one or more storage units 906 and further functionality 907 useful for the visiting network subscriber data storage node 125 to serve its purpose as visiting network subscriber data storage node 125. The instructions executable by said processor may be arranged as a computer program 905 stored in said memory 904. The processor 903 and the memory 904 may be arranged in an arrangement 901. The arrangement 901 may alternatively be a micro processor and adequate software and storage therefore, a Programmable Logic Device, PLD, or other electronic component(s)/processing circuit(s) configured to perform the actions, or methods, mentioned above.

According to an embodiment, the subscriber data requested comprises traffic data. According to an embodiment, the subscriber data requested comprises, in addition to traffic data also access credentials.

According to another embodiment, the visiting network subscriber data storage node is arranged in a centralized network and connected to the visiting network 120 via a control node 135) of the centralized network 130.

According to another embodiment, the visiting network subscriber data storage node comprises an HLR-FE 802b and a CUDB 804b, and the HLR-FE is arranged to send the request.

Figure 10:
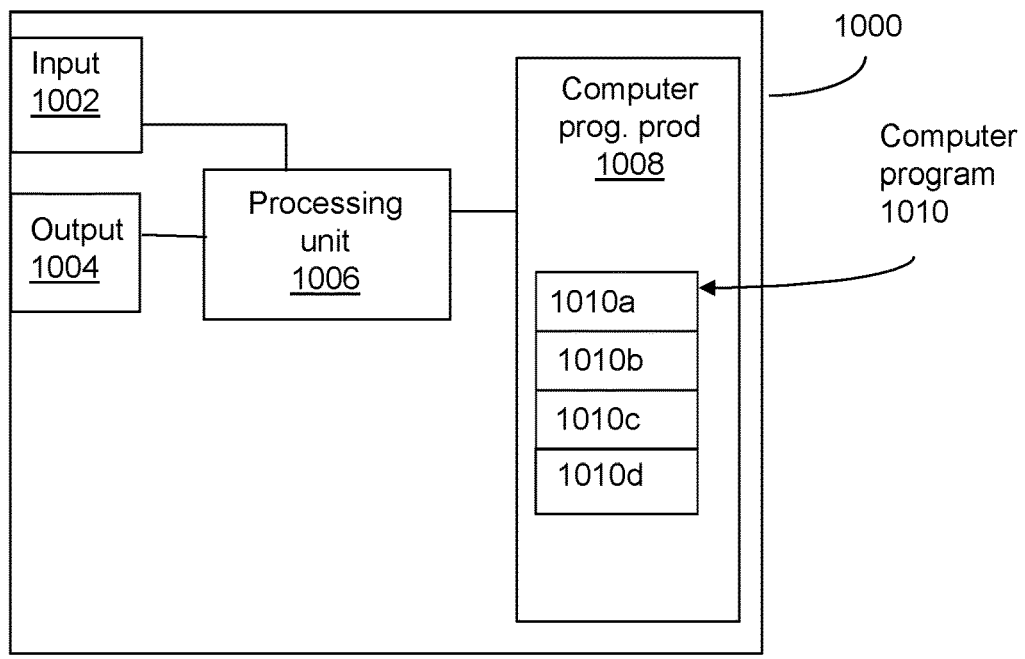

FIG. 10 schematically shows an embodiment of an arrangement 1000 for use in the visiting network subscriber data storage node 125, which arrangement also can be an alternative way of implementing an embodiment of the arrangement 901 illustrated in FIG. 9. Comprised in the arrangement 1000 is a processing unit 1006, e.g. with a DSP, Digital Signal Processor, or a microprocessor. The processing unit 1006 may be a single unit or a plurality of units to perform different actions of procedures described herein. The arrangement 1000 may also comprise an input unit 1002 for receiving signals from other entities, and an output unit 1004 for providing signal(s) to other entities. The input unit 1002 and the output unit 1004 may be arranged as an integrated entity.

Furthermore, the arrangement 1000 comprises at least one computer program product 1008 in the form of a non-volatile or volatile memory, e.g. an EEPROM (Electrically Erasable Programmable Read-only Memory), a flash memory, a disk drive or a RAM (Random-access memory). The computer program product 1008 comprises a computer program 1010, which comprises code means, which when executed in the processing unit 1006 in the arrangement 1000 causes the arrangement to perform the actions of any of the procedures described earlier in conjunction with FIG. 3.

The computer program 1010 may be configured as a computer program code structured in computer program modules. Hence, in an exemplifying embodiment, the code means in the computer program 1010 of the arrangement 1000 comprises a first receiving module 1010a for receiving the signalling request originating from the communication device, the signalling request being associated with the local subscriber ID and an identifying module 1010b for identifying that the local subscriber ID is associated with the home subscriber ID. The code means further comprises a requesting module 1010c for requesting a subscriber data from a subscriber data storage node 115 of the home communication network, the request comprising the home subscriber ID, and a second receiving module 1010d for receiving the subscriber data from the subscriber data storage node 115 of the home communication network.

Figure 11:
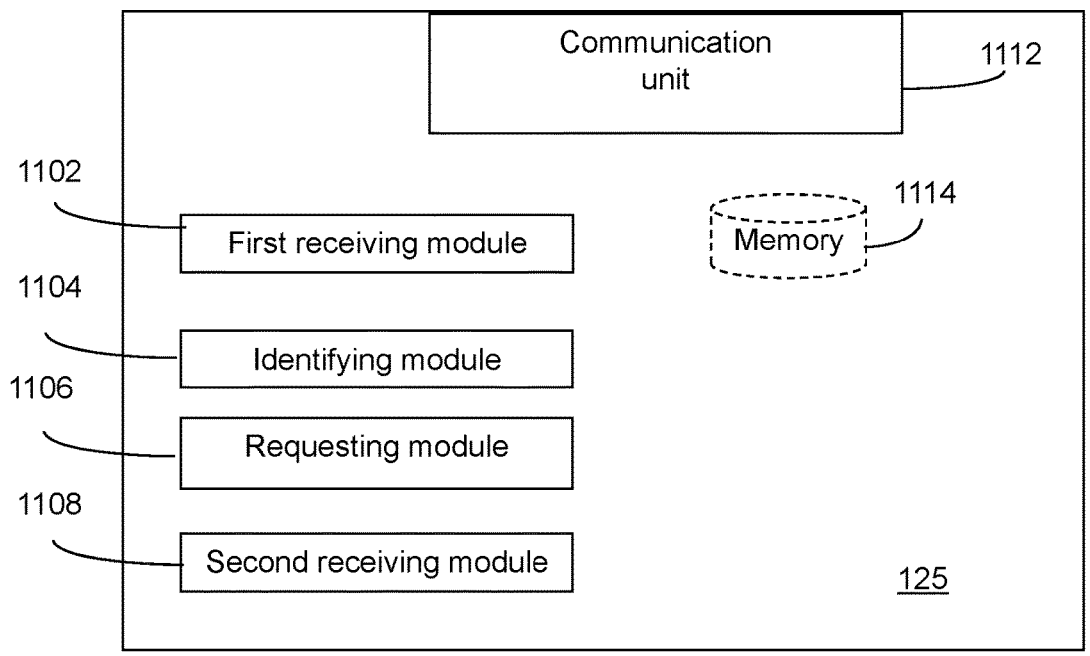

FIG. 11 shows a subscriber data storage node 125 of a visiting communication network 120 for handling a signalling request in a communication system comprising a home communication network 110 and the visiting communication network 120. The signalling request originates from a communication device 100 subscribing to the home communication network 110 and having a home subscriber ID for communication in the home communication network. The communication device is registered to the visiting communication network 120 with a local subscriber ID different from the home subscriber ID and the local subscriber ID is associated with the home subscriber ID. The subscriber data storage node 125 comprises a first receiving module 1102 for receiving the signalling request originating from the communication device, the signalling request being associated with the local subscriber ID and an identifying module 1104 for identifying that the local subscriber ID is associated with the home subscriber ID. The subscriber data storage node further comprises a requesting module 1106 for requesting a subscriber data from a subscriber data storage node 115 of the home communication network, the request comprising the home subscriber ID, and a second receiving module 1108 for receiving the subscriber data from the subscriber data storage node 115 of the home communication network. The visiting network subscriber data storage node 125 may also comprise a conventional communication unit 1112 similar to the communication unit 902 of FIG. 9 and a memory 1114.

Figure 12:
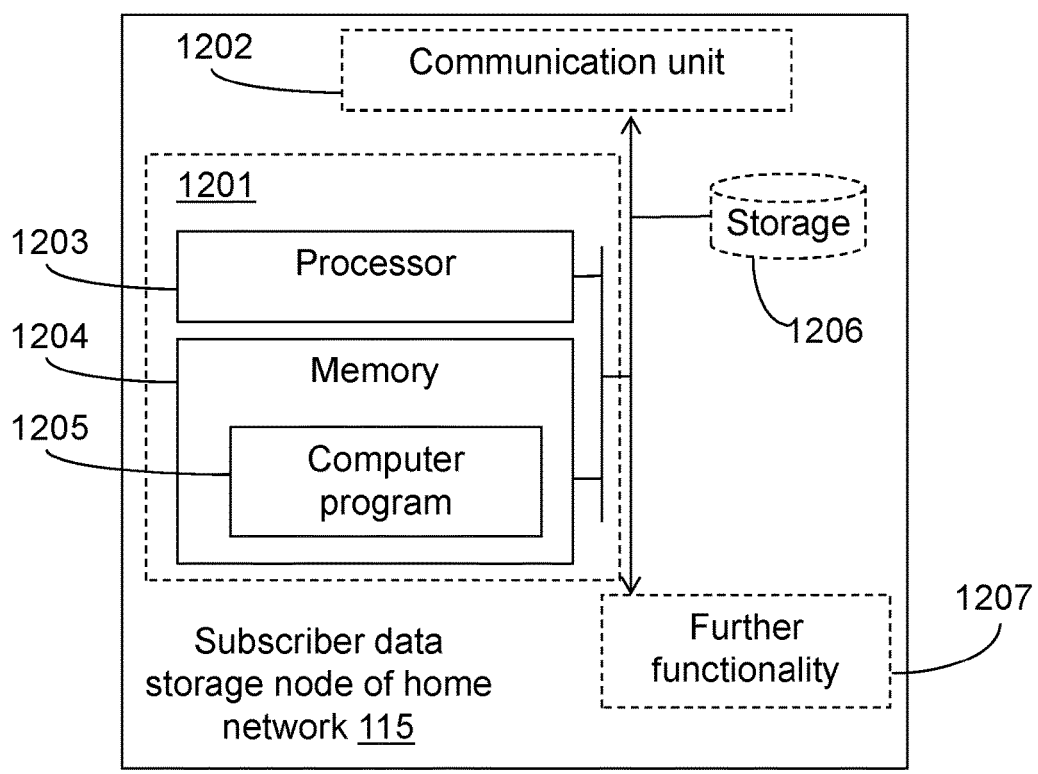

FIG. 12 (see also FIG. 1 or 5) describes a subscriber data storage node 115 of a home communication network 110) for communicating with a subscriber data storage node 125 of a visiting communication network 120. The subscriber data storage node of the visiting communication network has received a signalling request originating from a communication device 100 subscribing to the home communication network 110 and has a home subscriber ID for communication in the home communication network. The communication device is registered to the visiting communication network 120 with a local subscriber ID different from the home subscriber ID, the local subscriber ID being associated with the home subscriber ID. The subscriber data storage node 115 comprises a processor 1203 and a memory 1204, said memory containing instructions executable by said processor. Said home network subscriber data storage node 115 is operative for receiving a request of subscriber data from the subscriber data storage node 125 of the visiting network, wherein the request comprises the home subscriber ID, obtaining subscriber data of the home subscriber ID, and sending the obtained subscriber data to the subscriber data storage node of the visiting network. The home network subscriber data storage node 115 may further comprise a communication unit 1202, which may be considered to comprise conventional means for communicating from and/or to the other nodes in the network, such as the visiting network subscriber data storage node 125. The conventional communication means may include at least one transmitter and at least one receiver. The home network subscriber data storage node 115 may further comprise one or more storage units 1206 and further functionality 1207 useful for the home network subscriber data storage node 115 to serve its purpose as home network subscriber data storage node. The instructions executable by said processor may be arranged as a computer program 1205 stored in said memory 1204. The processor 1203 and the memory 1204 may be arranged in an arrangement 1201. The arrangement 1201 may alternatively be a micro processor and adequate software and storage therefore, a Programmable Logic Device, PLD, or other electronic component(s)/processing circuit(s) configured to perform the actions, or methods, mentioned above.

According to an embodiment, the home network subscriber data storage node 115 may further be arranged for granting access to the subscriber data storage node 125 of the visiting communication network for the obtaining of subscriber data.

According to another embodiment, the obtained subscriber data comprises traffic data and possibly also access credentials.

According to another embodiment, the home network subscriber data storage node 115 comprises an HLR-FE, and a CUDB, and wherein the requested subscriber data is obtained from the CUDB.

According to another embodiment, the home network subscriber data storage node 115 is arranged in a centralized network and connected to the home network 120 via a control node 135 of the centralized network 130.

The subscriber data storage node of the home network and/or the subscriber data storage node of the visiting network may according to one embodiment be a logical node that is physically distributed over a plurality of network nodes in the communication network, in other words, the functionality may be implemented according to a cloud computing concept.

Figure 13:
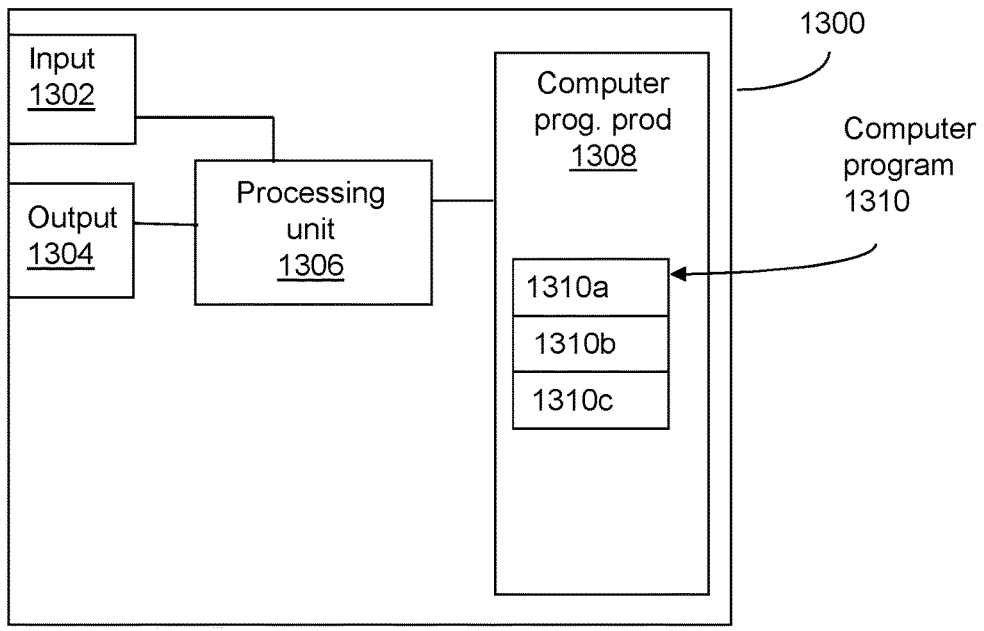

FIG. 13 schematically shows an embodiment of an arrangement 1300 for use in the home network subscriber data storage node 115, which arrangement also can be an alternative way of implementing an embodiment of the arrangement 1201 illustrated in FIG. 12. Comprised in the arrangement 1300 is a processing unit 1306, e.g. with a DSP, Digital Signal Processor, or a microprocessor. The processing unit 1306 may be a single unit or a plurality of units to perform different actions of procedures described herein. The arrangement 1300 may also comprise an input unit 1302 for receiving signals from other entities, and an output unit 1304 for providing signal(s) to other entities. The input unit 1302 and the output unit 1304 may be arranged as an integrated entity.

Furthermore, the arrangement 1300 comprises at least one computer program product 1308 in the form of a non-volatile or volatile memory, e.g. an EEPROM (Electrically Erasable Programmable Read-only Memory), a flash memory, a disk drive or a RAM (Random-access memory). The computer program product 1308 comprises a computer program 1310, which comprises code means, which when executed in the processing unit 1306 in the arrangement 1300 causes the arrangement to perform the actions of any of the procedures described earlier in conjunction with FIG. 4.

The computer program 1310 may be configured as a computer program code structured in computer program modules. Hence, in an exemplifying embodiment, the code means in the computer program 1310 of the arrangement 1300 comprises a receiving module 1310a for receiving a request of subscriber data from the subscriber data storage node 125 of the visiting network, wherein the request comprises the home subscriber ID, an obtaining module 1310b for obtaining subscriber data of the home subscriber ID, and a sending module 1310c for sending the obtained subscriber data to the subscriber data storage node of the visiting network.

Figure 14:
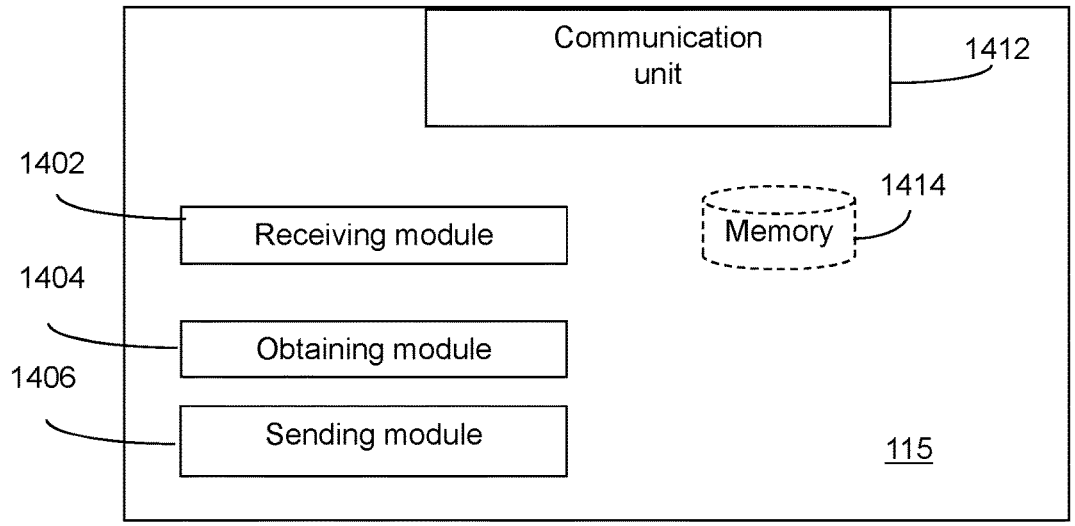

FIG. 14 shows an embodiment of a subscriber data storage node 115 of a home communication network 110 for communicating with a subscriber data storage node 125 of a visiting communication network 120. The subscriber data storage node of the visiting communication network has received a signalling request originating from a communication device 100 subscribing to the home communication network 110 and having a home subscriber ID for communication in the home communication network. The communication device is registered to the visiting communication network with a local subscriber ID different from the home subscriber ID, the local subscriber ID being associated with the home subscriber ID. The home network subscriber data storage node 115 comprises a receiving module 1402 for receiving a request of subscriber data from the subscriber data storage node 125 of the visiting network, wherein the request comprises the home subscriber ID, an obtaining module 1404 for obtaining subscriber data of the home subscriber ID, and a sending module 1406 for sending the obtained subscriber data to the subscriber data storage node of the visiting network. The home network subscriber data storage node 115 may also comprise a conventional communication unit 1412 similar to the communication unit 1202 of FIG. 12 and a memory 1414.

Individual of the processing units 1006 and 1306 of FIGS. 10 and 13, respectively, may be a single Central processing unit, CPU, but may also comprise two or more processing units. For example, the processing unit may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM (Electrical Erasable Programmable ROM), and the computer program modules described above could in alternative embodiments be distributed on different computer program products in the form of memories within the node.

Although the code means in the embodiments disclosed above in conjunction with FIGS. 9-14 are implemented as computer program modules which when executed in the processing unit causes the apparatus to perform the actions described above in the conjunction with figures mentioned above, at least one of the code means may in alternative embodiments be implemented at least partly as hardware circuits.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a subscriber data storage node of a visiting communication network for handling a signalling request in a communication system comprising a home communication network and the visiting communication network, the signalling request originating from a communication device subscribing to the home communication network and having a home subscriber identification (ID) for communication in the home communication network, the communication device being registered to the visiting communication network with a local subscriber ID different from the home subscriber ID, the local subscriber ID being associated with the home subscriber ID, wherein the subscriber data storage node of the visiting communication network has been granted access to a subscriber data storage node of the home communication network for obtaining subscriber data, wherein the subscriber data comprises traffic data and access credentials, the method comprising:
   receiving the signalling request originating from the communication device, the signalling request being associated with the local subscriber ID;
   identifying that the local subscriber ID is associated with the home subscriber ID;
   requesting the traffic data from the subscriber data storage node of the home communication network, the request comprising the home subscriber ID; and
   receiving the traffic data from the subscriber data storage node of the home communication network, wherein the access credentials originate from the visiting communication network.

2. The method according to claim 1, wherein the subscriber data storage node of the visiting network is arranged in a centralized network and wherein the subscriber data storage node of the visiting network is connected to the visiting network via a control node of the centralized network.

3. The method according to claim 1, wherein the subscriber data storage node of the visiting network comprises an HLR Front End (HLR-FE) and a Centralized User database (CUDB) and wherein the request is sent from the HLR-FE.

4. A method performed by a subscriber data storage node of a home communication network for communicating with a subscriber data storage node of a visiting communication network, wherein the subscriber data storage node of the visiting communication network has received a signalling request originating from a communication device subscribing to the home communication network and having a home subscriber identification (ID) for communication in the home communication network, the communication device being registered to the visiting communication network with a local subscriber ID different from the home subscriber ID, the local subscriber ID being associated with the home subscriber ID, wherein the subscriber data storage node of the visiting communication network has been granted access to the subscriber data storage node of the home communication network for obtaining subscriber data, wherein the subscriber data comprises traffic data and access credentials, the method comprising:
 receiving a request of the traffic data from the subscriber data storage node of the visiting network, wherein the request comprises the home subscriber ID;
 obtaining the traffic data of the home subscriber ID; and
 sending the obtained the traffic data to the subscriber data storage node of the visiting network, wherein the access credentials originate from the visiting communication network.

5. The method according to claim 4, wherein the subscriber data storage node of the home network comprises an HLR Front End (HLR-FE) and a Centralized User database (CUDB) and wherein the requested subscriber data is obtained from the CUDB.

6. The method according to claim 4, wherein the subscriber data storage node of the home network is arranged in a centralized network and wherein the subscriber data storage node of the home network is connected to the home network via a control node of the centralized network.

7. A subscriber data storage node of a visiting communication network for handling a signalling request in a communication system comprising a home communication network and the visiting communication network, the signalling request originating from a communication device subscribing to the home communication network and having a home subscriber identification for communication in the home communication network, the communication device being registered to the visiting communication network with a local subscriber ID different from the home subscriber ID, the local subscriber ID being associated with the home subscriber ID, wherein the subscriber data storage node of the visiting communication network has been granted access to a subscriber data storage node of the home communication network for obtaining subscriber data, wherein the subscriber data comprises traffic data and access credentials, the subscriber data storage node comprising a processor and a memory, said memory containing instructions executable by said processor whereby said subscriber data storage node is operative for:
 receiving the signalling request originating from the communication device, the signalling request being associated with the local subscriber ID;
 identifying that the local subscriber ID is associated with the home subscriber ID;
 requesting the traffic data from the subscriber data storage node of the home communication network, the request comprising the home subscriber ID, and
 receiving the traffic data from the subscriber data storage node of the home communication network, wherein the access credentials originate from the visiting communication network.

8. The subscriber data storage node according to claim 7, arranged in a centralized network and connected to the visiting network via a control node of the centralized network.

9. The subscriber data storage node according to claim 7, comprising an HLR Front End (HLR-FE) and a Centralized User database (CUDB) and wherein the HLR-FE is arranged to send the request.

10. A subscriber data storage node of a home communication network for communicating with a subscriber data storage node of a visiting communication network, wherein the subscriber data storage node of the visiting communication network has received a signalling request originating from a communication device subscribing to the home communication network and having a home subscriber identification (ID) for communication in the home communication network, the communication device being registered to the visiting communication network with a local subscriber ID different from the home subscriber ID, the local subscriber ID being associated with the home subscriber ID, wherein the subscriber data storage node of the visiting communication network has been granted access to the subscriber data storage node of the home communication network for obtaining subscriber data, wherein the subscriber data comprises traffic data and access credentials, the subscriber data storage node comprising a processor and a memory, said memory containing instructions executable by said processor whereby said subscriber data storage node is operative for:
 receiving a request for the traffic data from the subscriber data storage node of the visiting network, wherein the request comprises the home subscriber ID;
 obtaining the traffic data of the home subscriber ID; and
 sending the obtained the traffic data to the subscriber data storage node of the visiting network, wherein the access credentials originate from the visiting communication network.

11. The subscriber data storage node according to claim 10, arranged for granting access to the subscriber data storage node of the visiting communication network for the obtaining of subscriber data.

12. The subscriber data storage node according to claim 10, wherein the obtained subscriber data comprises traffic data and possibly also access credentials.

13. The subscriber data storage node according to claim 10, comprising an HLR Front End (HLR-FE) and a Centralized User database (CUDB) and wherein the requested subscriber data is obtained from the CUDB.

14. The subscriber data storage node according to claim 10, arranged in a centralized network and connected to the home network via a control node of the centralized network.

15. A non-transitory computer readable medium comprising computer readable code, which, when run in a subscriber data storage node of a visiting communication network arranged for handling a signalling request originating from a communication device subscribing to a home communication network and having a home subscriber identification (ID) for communication in the home communication network, the communication device being registered to the visiting communication network with a local subscriber ID different from the home subscriber ID, the local subscriber ID being associated with the home subscriber ID, wherein the subscriber data storage node of the visiting communication network has been granted access to a subscriber data storage node of the home communication network for obtaining subscriber data, wherein the subscriber data comprises traffic data and access credentials, causes the subscriber data storage node of the visiting communication network to perform the following steps:
- receiving the signalling request originating from the communication device, the signalling request being associated with the local subscriber ID;
- identifying that the local subscriber ID is associated with the home subscriber ID;
- requesting the traffic data from the subscriber data storage node of the home communication network, the request comprising the home subscriber ID; and
- receiving the traffic data from the subscriber data storage node of the home communication network, wherein the access credentials originate from the visiting communication network.

16. A non-transitory computer readable medium comprising computer readable code, which, when run in a subscriber data storage node of a home communication network for communicating with a subscriber data storage node of a visiting communication network regarding a signalling request originating from a communication device subscribing to the home communication network and having a home subscriber identification (ID) for communication in the home communication network, the communication device being registered to the visiting communication network with a local subscriber ID different from the home subscriber ID, the local subscriber ID being associated with the home subscriber ID, wherein the subscriber data storage node of the visiting communication network has been granted access to the subscriber data storage node of the home communication network for obtaining subscriber data, wherein the subscriber data comprises traffic data and access credentials, causes the subscriber data storage node of the home communication network to perform the following steps:
- receiving a request of subscriber data from the subscriber data storage node of the visiting network, wherein the request comprises the home subscriber ID;
- obtaining the traffic data of the home subscriber ID; and
- sending the obtained traffic data to the subscriber data storage node of the visiting network, wherein the access credentials originate from the visiting communication network.

* * * * *